US011704273B2

(12) United States Patent
Kawamata et al.

(10) Patent No.: US 11,704,273 B2
(45) Date of Patent: Jul. 18, 2023

(54) INFORMATION INPUT DEVICE, METHOD, AND COMPUTER-READABLE MEDIUM FOR OPERATING A CONTROLLER IN DIFFERENT MODES CORRESPONDING TO DIFFERENT DEVICE DRIVERS

(71) Applicant: Wacom Co., Ltd., Saitama (JP)

(72) Inventors: Naoko Kawamata, Saitama (JP); Jinhua Gu, Beijing (CN); Fan Fu, Saitama (JP); Takaya Oyama, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 16/918,910

(22) Filed: Jul. 1, 2020

(65) Prior Publication Data

US 2021/0034562 A1 Feb. 4, 2021

(30) Foreign Application Priority Data

Jul. 30, 2019 (JP) .................. 2019-140063

(51) Int. Cl.
*G06F 13/40* (2006.01)
*G06F 13/42* (2006.01)
*G06F 3/0354* (2013.01)

(52) U.S. Cl.
CPC ...... *G06F 13/4072* (2013.01); *G06F 3/03545* (2013.01); *G06F 13/4282* (2013.01); *G06F 2213/0042* (2013.01)

(58) Field of Classification Search
CPC ............. G06F 13/4072; G06F 13/4282; G06F 3/03545
See application file for complete search history.

(56) References Cited

U.S. PATENT DOCUMENTS

| 2002/0063696 | A1* | 5/2002 | Kubo ............. | G06F 3/0488 345/173 |
| 2005/0221894 | A1* | 10/2005 | Lum .............. | A63F 13/235 463/37 |
| 2012/0054372 | A1* | 3/2012 | Chen ............. | G06F 9/4411 710/13 |

(Continued)

FOREIGN PATENT DOCUMENTS

| JP | 2017033141 A | 2/2017 |
| JP | 2018-106594 A | 7/2018 |
| WO | 2005116845 A1 | 12/2005 |

OTHER PUBLICATIONS

Japanese Notice of Reasons for Refusal dated May 23, 2023, for the corresponding Japanese Patent Application No. 2019-140063, 13 pages. (with English Translation).

*Primary Examiner* — Phong H Dang
(74) *Attorney, Agent, or Firm* — Seed IP Law Group LLP

(57) ABSTRACT

An information input device includes: a communication interface configured to communicate with each of a first external apparatus that operates using a first operating system and a second external apparatus that operates using a second operating system; and a controller configured to operate in a first mode corresponding to a first driver used by the first external apparatus when transferring data to the first external apparatus, and operate in a second mode corresponding to a second driver different from the first driver and used by the second external apparatus when transferring data to the second external apparatus.

16 Claims, 5 Drawing Sheets

(56) References Cited

U.S. PATENT DOCUMENTS

| | | | |
|---|---|---|---|
| 2013/0031277 A1* | 1/2013 | Lu | G06F 9/4411 710/10 |
| 2013/0055015 A1* | 2/2013 | Gui | G06F 11/0745 714/15 |
| 2014/0297901 A1* | 10/2014 | Peng | G06F 9/4411 710/16 |
| 2016/0062923 A1* | 3/2016 | Holzbecher | G06N 7/005 710/63 |
| 2016/0357692 A1* | 12/2016 | Lu | G06F 13/385 |
| 2017/0031668 A1 | 2/2017 | Kikuchi | |
| 2017/0357474 A1* | 12/2017 | Ferris | G06F 13/4282 |
| 2018/0181221 A1 | 6/2018 | Nakajima et al. | |
| 2018/0234301 A1* | 8/2018 | Ozaki | H04L 41/12 |

* cited by examiner

| PRODUCT ID | VENDOR ID | DRIVER |
|---|---|---|
| PEN TABLET | A | DA |
| PEN TABLET | - | DB |
| ⋮ | ⋮ | ⋮ |

INFORMATION INPUT DEVICE, METHOD, AND COMPUTER-READABLE MEDIUM FOR OPERATING A CONTROLLER IN DIFFERENT MODES CORRESPONDING TO DIFFERENT DEVICE DRIVERS

BACKGROUND

Technical Field

The present disclosure relates to an information input device, a method, and a program, and particularly to an information input device for inputting information to a personal computer (PC) or a smart phone, and a related method and a related program.

Description of the Related Art

A pen tablet as a kind of information input device for inputting information to a PC is a device configured to sequentially detect the position of an electronic pen on a panel surface, and supply the position of the electronic pen to the PC. Japanese Patent Laid-Open No. 2018-106594 discloses an example of this type of pen tablet.

Progress has recently been made in a multi-device environment in which one person uses a plurality of devices such as a PC and a smart phone and a multi-operating system (OS) environment in which one person uses a plurality of operating systems (OSes) such as Windows and Android. Accordingly, information input devices also need to support the multi-device environment and the multi-OS environment.

BRIEF SUMMARY

Hence, it is an object of the present disclosure to provide an information input device, a method, and a program that support the multi-device environment and the multi-OS environment.

According to the present disclosure, there is provided an information input device including: a communication interface configured to communicate with each of a first external apparatus operating using a first operating system and a second external apparatus operating using a second operating system; and a controller configured to operate in a first mode corresponding to a first driver used by the first external apparatus when transferring data to the first external apparatus, and operate in a second mode corresponding to a second driver different from the first driver and used by the second external apparatus when transferring data to the second external apparatus.

According to the present disclosure, there is provided a method including: starting a communication with an external apparatus while a controller operates in a first mode; determining whether an operating system of the external apparatus is a second operating system based on a result of the communication; and switching from operating the controller in the first mode to operating the controller in a second mode when a result of the determining is that the operating system of the external apparatus as a communication partner is the second operating system.

According to the present disclosure, there is provided a non-transitory computer-readable medium storing computer-readable instructions that, when executed by a processor, cause a computer to: start a communication with an external apparatus while operating the controller in a first mode; determine whether an operating system of the external apparatus is a second operating system based on a result of the communication; and switch from operating the controller in the first mode to operating the controller in in a second mode when the operating system of the external apparatus is determined to be the second operating system.

According to the present disclosure, it is possible to provide an information input device, a method, and a program that support the multi-device environment and the multi-OS environment.

DETAILED DESCRIPTION

An embodiment of the present disclosure will hereinafter be described in detail with reference to the accompanying drawings.

Figure 1A:
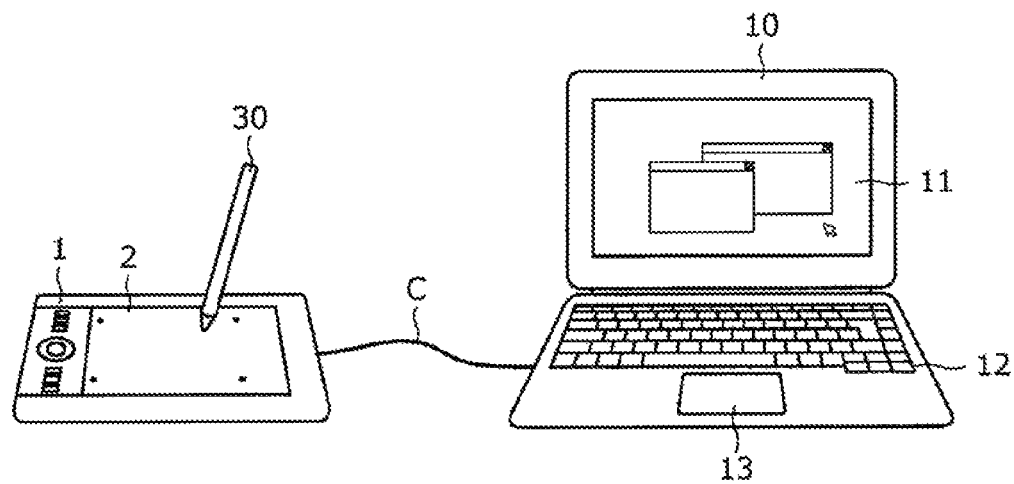
FIG. 1A is a diagram illustrating a state in which a pen tablet according to an embodiment of the present disclosure is connected to a PC.
Figure 1B:
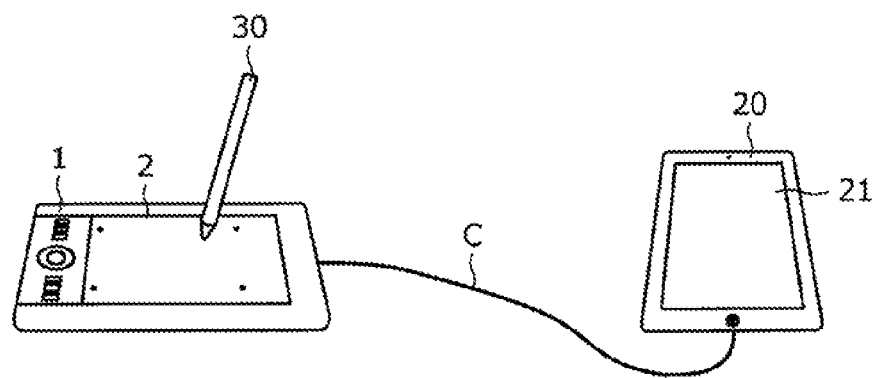
FIG. 1B is a diagram illustrating a state in which the pen tablet according to the present embodiment is connected to a smart phone.

FIG. 1A is a diagram illustrating a state in which a pen tablet 1 according to an embodiment of the present disclosure is connected to a PC 10. FIG. 1B is a diagram illustrating a state in which the pen tablet 1 according to the present embodiment is connected to a smart phone 20.

The pen tablet 1 includes a touch sensor 2 constituting a touch surface. In addition, an electronic pen 30 is a pen type terminal (stylus). Incidentally, the electronic pen 30 may have an ink exuding function such as that of a ballpoint pen. The pen tablet 1 in this case is used in a state in which paper is placed on the touch surface.

The pen tablet 1 is configured to be able to detect coordinates indicating the position of the electronic pen 30 on the touch surface by a capacitance system or an electromagnetic induction system. In addition, the electronic pen 30 is configured to be able to transmit, to the pen tablet 1, various kinds of data such as a pen pressure value indicating a force applied to a pen tip of each electronic pen, side switch information indicating an on-off state of a side switch provided to each electronic pen, and a stylus identification (ID) stored by each pen in advance. Data may be configured to be able to be transmitted also from the pen tablet 1 to the electronic pen 30. In this case, a command for specifying data to be transmitted by the electronic pen 30, for example, is transmitted from the pen tablet 1 to the electronic pen 30.

The PC 10 is, for example, a notebook type computer, and is a PC operating on an OS of Microsoft Windows (registered trademark), for example. The PC 10 includes an output device including a display 11 and an input device including a keyboard 12 and a mouse pad 13. The smart phone 20 is, for example, a flat plate type computer, and is, for example, a smart phone operating on an OS of Android (registered trademark). The smart phone 20 includes a touch screen 21 having a size that enables it to be held in one hand. In the following, description will be continued assuming this typical example. However, the PC 10 may be, for example, a desktop type computer or a computer functioning as a server. In addition, the smart phone 20 may be a tablet terminal having a larger touch screen 21.

The pen tablet 1 according to the present embodiment is configured to be able to be connected to each of the PC 10 and the smart phone 20 by a USB cable C illustrated in FIGS. 1A and 1B. Incidentally, while description will be made of an example of thus using connection based on the USB standard in the present embodiment, the present disclosure is applicable also to cases of using connection based on another standard such as Lightning and Bluetooth (registered trademark).

Figure 2A:
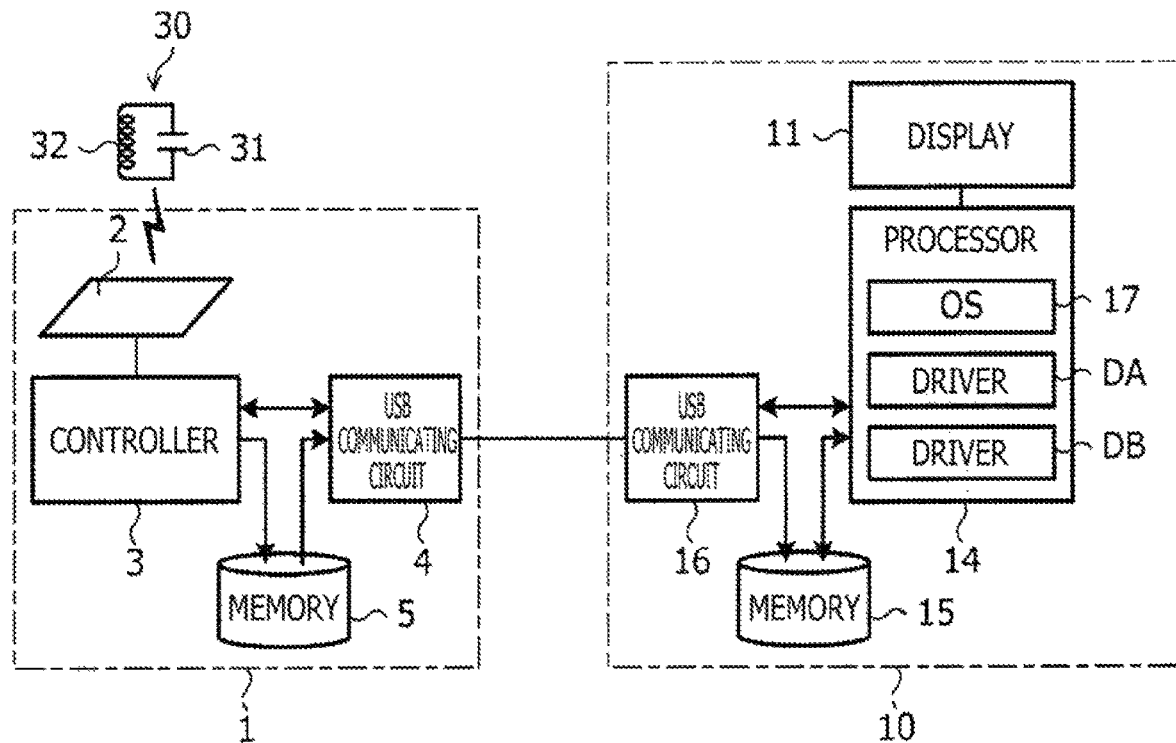
FIGS. 2A and 2B are diagrams illustrating internal configurations of the pen tablet, an electronic pen, the PC, and the smart phone.
Figure 2B:
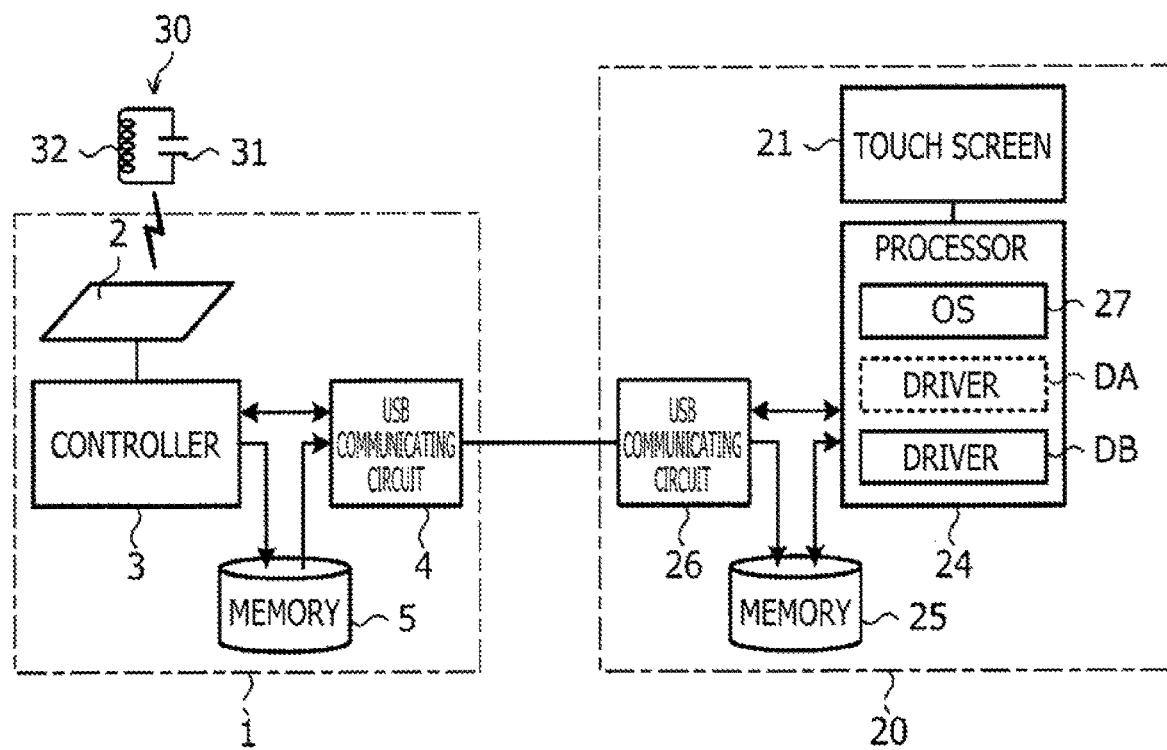

FIGS. 2A and 2B are diagrams illustrating internal configurations of the pen tablet 1, the electronic pen 30, the PC 10, and the smart phone 20. FIG. 2A corresponds to FIG. 1A. FIG. 2B corresponds to FIG. 1B. In the following, referring to FIGS. 2A and 2B, more detailed description will be made of a configuration of each of the pen tablet 1, the electronic pen 30, the PC 10, and the smart phone 20.

The electronic pen 30 includes a loop coil (LC) resonance circuit constituted of a capacitor 31 and an inductor 32. The inductor 32 plays a role of charging the capacitor 31 by generating an induced voltage according to a magnetic field supplied from the touch sensor 2 of the pen tablet 1. The inductor 32 after the supply of the magnetic field from the touch sensor 2 is stopped transmits a reflection signal to the pen tablet 1 by using the voltage stored in the capacitor 31. The thus transmitted reflection signal includes, in this order, a continuous signal for position detection, a start signal indicating an end of the continuous signal, and a data signal representing data to be transmitted to the pen tablet 1 by the electronic pen 30.

The capacitor 31 is configured to change in capacitance thereof according to a force (=pen pressure) applied from the touch surface to the pen tip of the electronic pen 30. When the capacitance of the capacitor 31 changes, the resonance frequency of the resonance circuit changes. Therefore, the frequency of the reflection signal transmitted as described above also changes according to the pen pressure. The above-described pen pressure value is transmitted from the electronic pen 30 to the pen tablet 1 by the change in the frequency.

The pen tablet 1 includes a controller 3, a USB communicating circuit 4, and a memory 5 in addition to the touch sensor 2 illustrated also in FIGS. 1A and 1B.

Figures 3, 4:
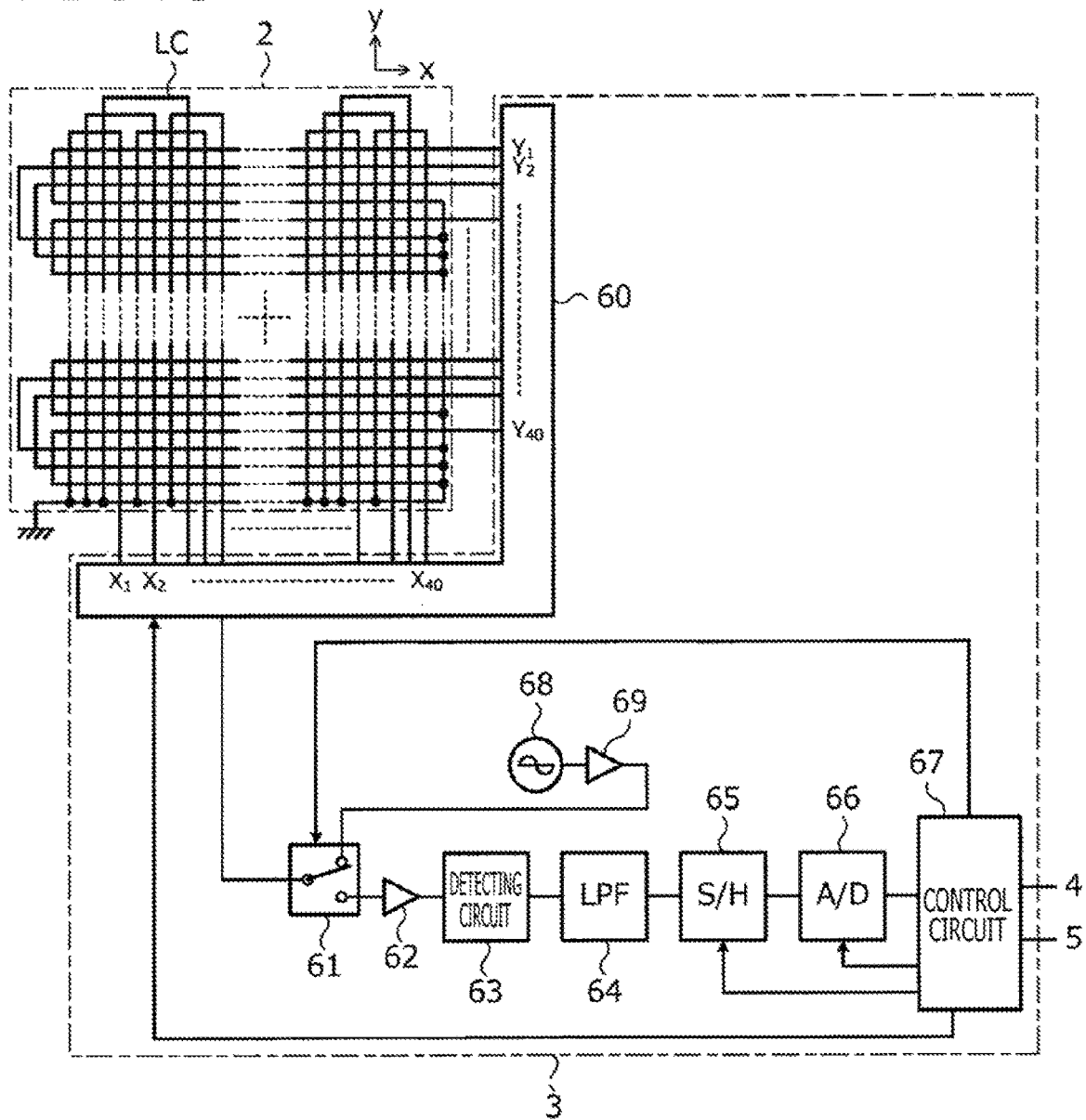
FIG. 3 is a diagram illustrating internal configurations of a touch sensor and a controller.
FIG. 4 is a diagram illustrating a driver table stored within memories in advance.

FIG. 3 is a diagram illustrating internal configurations of the touch sensor 2 and the controller 3. As illustrated in the figure, the touch sensor 2 has a configuration in which a plurality of loop coils LC are arranged within a rectangular flat surface region. Each loop coil LC has one end grounded, and has another end connected to the controller 3. FIG. 3 illustrates, as an example of the plurality of loop coils LC, 40 loop coils $X_1$ to $X_{40}$ extending in a y-direction illustrated in the figure and 40 loop coils $Y_1$ to $Y_{40}$ extending in an x-direction orthogonal to the y-direction. However, the number of loop coils LC to be provided to the touch sensor 2 is not limited to this.

As illustrated in FIG. 3, the controller 3 includes a selecting circuit 60, a switch circuit 61, an amplifier 62, a detecting circuit 63, a low-pass filter (LPF) 64, a sample and hold circuit (S/H) 65, an analog-to-digital conversion circuit (A/D) 66, a control circuit 67, an oscillator 68, and a current driver 69.

The selecting circuit 60 is connected with the other end of each loop coil LC. The selecting circuit 60 is a circuit that selects one or more loop coils among the loop coils $X_1$ to $X_{40}$ and $Y_1$ to $Y_{40}$ according to control from the control circuit 67, and connects the selected one or more loop coils to the switch circuit 61.

The switch circuit 61 is a switch having one common terminal and two selecting terminals. The switch circuit 61 is configured to be able to switch the selecting terminals connected to the common terminal according to control from the control circuit 67. The common terminal of the switch circuit 61 is connected with the selecting circuit 60. One selecting terminal of the switch circuit 61 is connected with the input terminal of the amplifier 62. The other selecting terminal of the switch circuit 61 is connected with the output terminal of the current driver 69.

The amplifier 62 is a circuit that amplifies a voltage signal supplied from the selecting circuit 60 via the switch circuit 61, and outputs the voltage signal to the detecting circuit 63. The detecting circuit 63 is a circuit that generates an envelope signal by performing envelope detection on the voltage signal output from the amplifier 62, and outputs the envelope signal to the low-pass filter 64. The low-pass filter 64 plays a role of removing a high-frequency component from the envelope signal generated by the detecting circuit 63. The sample and hold circuit 65 is configured to perform a sampling operation and a holding operation on the above-described envelope signal, whose high-frequency component has been removed by the low-pass filter 64, at predetermined time intervals. The analog-to-digital conversion circuit 66 generates a digital signal by subjecting the signal held by the sample and hold circuit 65 to analog-to-digital conversion. The analog-to-digital conversion circuit 66 outputs the digital signal to the control circuit 67.

The control circuit 67 is a processor that operates according to a program stored in the memory 5 illustrated in FIGS. 2A and 2B. The control circuit 67 is connected to the USB communicating circuit 4 and the memory 5. The control circuit 67 is configured to not only control the selecting circuit 60, the switch circuit 61, the sample and hold circuit 65, and the analog-to-digital conversion circuit 66 but also perform processing of distinguishing and detecting whether or not the electronic pen 30 is in a contact state or a hovering state and generating hover coordinates as the position coordinates of the electronic pen 30 when the electronic pen 30 is in the hovering state and contact coordinates as the position coordinates of the electronic pen 30 when the electronic pen 30 is in the contact state, processing of obtaining various kinds of data (the pen pressure value, the side switch information, the stylus ID, and the like) transmitted by the electronic pen 30, and the like.

The oscillator 68 is configured to generate an alternating-current signal having a predetermined frequency. The current driver 69 plays a role of converting the alternating-current signal output from the oscillator 68 into a current signal, and supplying the current signal to the switch circuit 61.

Concrete description will be made of obtainment by the control circuit 67 of the coordinates of the electronic pen 30 and the various kinds of data transmitted by the electronic pen 30. First, the control circuit 67 connects the other selecting terminal (selecting terminal connected to the current driver 69) of the switch circuit 61 to the common terminal, and makes the selecting circuit 60 select one of the loop coils $X_1$ to $X_{40}$ and $Y_1$ to $Y_{40}$. Then, the current signal output from the current driver 69 generates a magnetic field in the selected loop coil LC. Incidentally, while one loop coil LC is selected in this case, a total of two loop coils $X_1$ to $X_{40}$, that is, one loop coil from among the loop coils $X_1$ to $X_{40}$ and one loop coil from among the loop coils $Y_1$ to $Y_{40}$ may be selected, for example. In addition, a loop coil dedicated to the generation of the magnetic field may be disposed along the periphery of the touch sensor 2 separately from the loop coils $X_1$ to $X_{40}$ and $Y_1$ to $Y_{40}$, and only the dedicated loop coil may be selected in this stage.

When the electronic pen 30 enters the magnetic field generated in the loop coil LC, an induced voltage is generated in the inductor 32 (FIG. 2) of the electronic pen 30, and a charge is stored in the capacitor 31 (FIG. 2), as described above. After the passage of a predetermined time since the control circuit 67 connects the other selecting terminal of the switch circuit 61 to the common terminal, the control circuit 67 next connects the one selecting terminal (selecting terminal connected to the amplifier 62) of the switch circuit 61 to the common terminal. The generation of the magnetic field from the loop coil LC is then ended. In response thereto, the electronic pen 30 starts to transmit the reflection signal described above.

The control circuit 67 is configured to determine the content of the reflection signal transmitted by the electronic pen 30 by decoding the digital signal supplied from the analog-to-digital conversion circuit 66. Then, a voltage generated in each of the loop coils $X_1$ to $X_{40}$ and $Y_1$ to $Y_{40}$ is scanned by consecutively changing the loop coil LC selected by the selecting circuit 60 while the electronic pen 30 is transmitting the continuous signal. The shorter a distance between the loop coil LC and the pen tip of the electronic pen 30, the higher the thus detected voltage. The control circuit 67 can therefore obtain coordinates indicating the position of the electronic pen 30 from a scanning result.

Incidentally, in order to shorten a scanning time, the position detection may be performed by scanning all of the loop coils LC as described above only for a first time (in this case, the first position detection is performed while the start signal and the data signal are regarded as the continuous signal during the transmission of the start signal and the data signal by the electronic pen 30), and only loop coils LC located in the vicinity of the previously detected position may be scanned from a second time.

On the other hand, while the electronic pen 30 is transmitting the data signal, the control circuit 67 makes the selecting circuit 60 select one of the loop coils LC (usually, one closest to the detected position of the electronic pen 30) according to the detected position of the electronic pen 30. Then, the side switch information or the stylus ID transmitted by the electronic pen 30 is obtained from a result of decoding the signal obtained through the thus selected loop coil LC.

In addition, the control circuit 67 is configured to detect the frequency of the reflection signal transmitted by the electronic pen 30, and obtain the pen pressure value transmitted by the electronic pen 30 from the detected frequency. The control circuit 67 is configured to distinguish and detect whether the electronic pen 30 is in either of the hovering state and the contact state based on the thus obtained pen pressure value.

The description returns to FIGS. 2A and 2B. The USB communicating circuit 4 is a communication interface configured to be capable of performing communication with each of various kinds of external apparatuses including the PC 10 and the smart phone 20 according to the USB standard. The USB communicating circuit 4 is configured to establish communication based on USB with the external apparatuses according to control of the controller 3.

Here, driver software will be described. When the pen tablet 1 is connected to an external apparatus such as the PC 10 and the smart phone 20, driver software (hereinafter referred to as simply as a "driver") for the connected pen tablet 1 needs to be started on the external apparatus side. In order to realize this start, the OS of the external apparatus stores, in advance, a driver table associating a vendor ID indicating the vendor of the pen tablet with a driver to be applied.

The OS of the external apparatus reads the vendor ID from the pen tablet 1 by using a predetermined protocol when the pen tablet 1 is connected. Then, the OS of the external apparatus determines the driver to be started based on the read vendor ID and the driver table, and starts the determined driver.

In a case where the driver to be started is determined but the driver is not installed in the external apparatus, the OS of the external apparatus performs automatic installation of the driver. In a case where the automatic installation cannot be performed, the OS of the external apparatus makes display for prompting for manual installation by a user. Thus, ultimately, the driver as described in the driver table can be started.

The PC 10 and the smart phone 20 are configured to use the driver to connect to the pen tablet 1 based on the USB standard.

The PC 10 is configured to be able to use, as the driver, both of a pen tablet driver DA, which is independently provided by the vendor of the pen tablet 1, and a versatile pen tablet driver DB. On the other hand, a situation is conceivable in which a part of models of smart phones 20 are configured to be able to use both of the pen tablet drivers DA and DB, and a part of models of smart phones 20 are configured to be able to use only the pen tablet driver DB. In view of such a situation of provision of the drivers, the controller 3 is configured to operate in a mode corresponding to the pen tablet driver DA (which mode will hereinafter be referred to as a "PC mode") when transferring data to the PC 10 based on the USB standard, and operate in a mode corresponding to the pen tablet driver DB (which mode will hereinafter be referred to as a "smart phone mode") when transferring data to the smart phone 20 based on the USB standard. Because the corresponding drivers are thus different, different devices appear to be connected as viewed from the external apparatus side when the controller 3 operates in the PC mode and when the controller 3 operates in the smart phone mode.

The data transferred to the external apparatus by the controller 3 includes the coordinates of the electronic pen 30 which coordinates are obtained as described above and the various kinds of data received from the electronic pen 30. The controller 3 is configured to transfer these pieces of data to the external apparatus via the USB communicating circuit 4 each time the controller 3 obtains the data. The external apparatus performs processing such as the control of a cursor, the generation of stroke data, and rendering based on the coordinates and the various kinds of data thus supplied.

The memory 5 is a storage device configured to be able to store various kinds of programs and data related to the operation of the controller 3. The operation of the controller 3 described in the present embodiment is implemented by the controller 3 (more specifically, the control circuit 67 illustrated in FIG. 3) by reading and executing a program stored in the memory 5.

Next, the PC 10 includes a processor 14, a memory 15, and a USB communicating circuit 16 in addition to the display 11 described above. Incidentally, FIGS. 2A and 2B do not illustrate the keyboard 12 and the mouse pad 13 illustrated in FIG. 1A.

The processor 14 is a processor that operates according to a program stored in the memory 15. The processor 14 is connected to the display 11, the memory 15, and the USB communicating circuit 16. The program executed by the processor 14 includes not only an OS 17 (for example, Microsoft Windows (registered trademark)) of the PC 10 but also the above-described pen tablet drivers DA and DB.

The memory 15 plays a role of not only storing various kinds of programs and data related to the operation of the processor 14 but also storing coordinate data received from the pen tablet 1. The processor 14 performs processing such as the control of a cursor, the generation of stroke data, and rendering based on coordinates and various kinds of data written successively from the pen tablet 1 to the memory 15.

The USB communicating circuit 16 is a communication interface configured to be capable of performing communication with each of various kinds of external apparatuses including the pen tablet 1 according to the USB standard. The USB communicating circuit 16 is configured to establish communication based on USB with the external apparatuses including the pen tablet 1 according to control of the processor 14.

Next, the smart phone 20 includes a processor 24, a memory 25, and a USB communicating circuit 26 in addition to the touch screen 21 described above.

The processor 24 is a processor that operates according to a program stored in the memory 25. The processor 24 is connected to the touch screen 21, the memory 25, and the USB communicating circuit 26. The program executed by the processor 24 includes not only an OS 27 (for example, Android (registered trademark)) of the smart phone 20 but also the above-described pen tablet driver DB. The pen tablet driver DA may be further included depending on the model of the smart phone 20.

The memory 25 plays a role of not only storing various kinds of programs and data related to the operation of the processor 24 but also storing coordinates and various kinds of data received from the pen tablet 1. The processor 24 performs processing such as the control of a cursor, the generation of stroke data, and rendering based on the coordinates and the various kinds of data written successively from the pen tablet 1 to the memory 25.

The USB communicating circuit 26 is a communication interface configured to be capable of performing communication with each of various kinds of external apparatuses including the pen tablet 1 according to the USB standard. The USB communicating circuit 26 is configured to establish communication based on USB with the external apparatuses including the pen tablet 1 according to control of the processor 24.

FIG. 4 is a diagram illustrating the driver table stored within the memories 15 and 25 in advance. As illustrated in the figure, the driver table stores product IDs and vendor IDs of external apparatuses and drivers to be started in association with each other. A product ID is identification information indicating a type of external apparatus (pen tablet or the like). A vendor ID is identification information indicating a vendor (manufacturer) of the external apparatus.

When each of the processors 14 and 24 starts communication with an external apparatus via the USB communicating circuit 16 or 26, the processor first requests the external apparatus to transmit a product ID and a vendor ID. Then, each of the processors 14 and 24 determines a driver to be started by referring to the driver table based on the product ID and the vendor ID sent from the external apparatus as a result of the request.

In the driver table of FIG. 4, the pen tablet driver DA is associated with a combination of a product ID indicating a pen tablet and a vendor ID indicating a vendor A. The driver thus associated with the specific vendor ID is typically the own driver of the vendor. In addition, the pen tablet driver DB is associated with a product ID indicating a pen tablet without the vendor ID being specified. The driver thus not associated with any specific vendor ID is typically a versatile driver. According to the driver table of FIG. 4, the processors 14 and 24 apply the pen tablet driver DA to the pen tablet 1 of the vendor A, and apply the pen tablet driver DB to the pen tablets 1 of other than the vendor A.

Here, in a case where the driver determined by referring to the driver table is not installed within the PC 10, the processor 14, for example, automatically downloads the driver from a server computer, installs the driver, and then applies the driver. In a case where the driver cannot be downloaded from the server computer, the processor 14 makes display for prompting the user to install the driver.

On the other hand, in the smart phone 20 operating on the OS 27, the processor 24 decides to start the pen tablet driver DA based on the driver table. However, the pen tablet driver DA is not installed on the smart phone 20, and therefore the pen tablet driver DA cannot be started. Hence, the smart phone 20 and the pen tablet 1 are in a state of not being able to communicate with each other.

In order for the smart phone 20 and the pen tablet 1 to be in a state of being able to communicate with each other, it is sufficient for the smart phone 20 to start the pen tablet driver DB. The present embodiment realizes the start of the pen tablet driver DB by processing on the pen tablet 1 side. Details of this processing will be described later.

Figure 5:
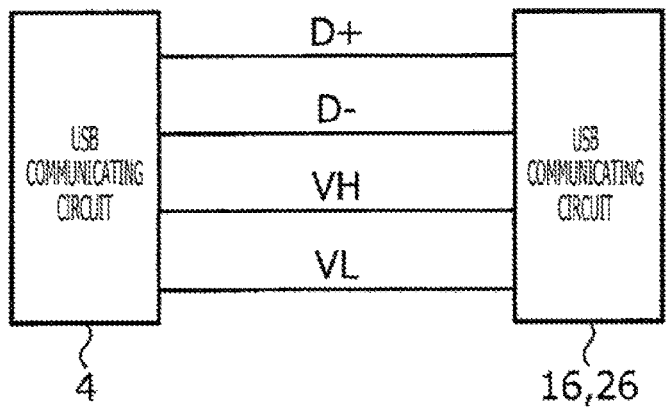
FIG. 5 is a diagram illustrating concrete connection wiring between a universal serial bus (USB) communicating circuit of the pen tablet and each of a USB communicating unit of the PC and a USB communicating circuit of the smart phone.

FIG. 5 is a diagram illustrating concrete connection wiring between the USB communicating circuit 4 of the pen tablet 1 and each of the USB communicating circuit 16 of the PC 10 and the USB communicating circuit 26 of the smart phone 20. As illustrated in the figure, the USB communicating circuit 4 and each of the USB communicating circuits 16 and 26 are connected to each other via four pieces of wiring, that is, signal wiring D+ and D− and power supply wiring VH and VL. When the USB communicating circuit 16 or the USB communicating circuit 26 is connected to the USB communicating circuit 4, the potential of the signal wiring D+ is first raised by only a predetermined value by the controller 3 of the pen tablet 1 (pull-up). The processor 14 or 24 is configured to detect that an external apparatus is connected to the USB communicating circuit 16 or 26 by detecting this pull-up. Detecting that the external apparatus is connected to the USB communicating circuit 16 or 26, the processor 14 or 24 starts communication with the external apparatus by using the signal wiring D+ and D−, and starts power supply to the external apparatus through the power supply wiring VH and VL.

Next, processing on the pen tablet 1 side for making the pen tablet 1 of the vendor A able to communicate with the smart phone 20 will be described in detail with reference to a processing sequence between each of the PC 10 and the smart phone 20 and the pen tablet 1.

Figure 6:
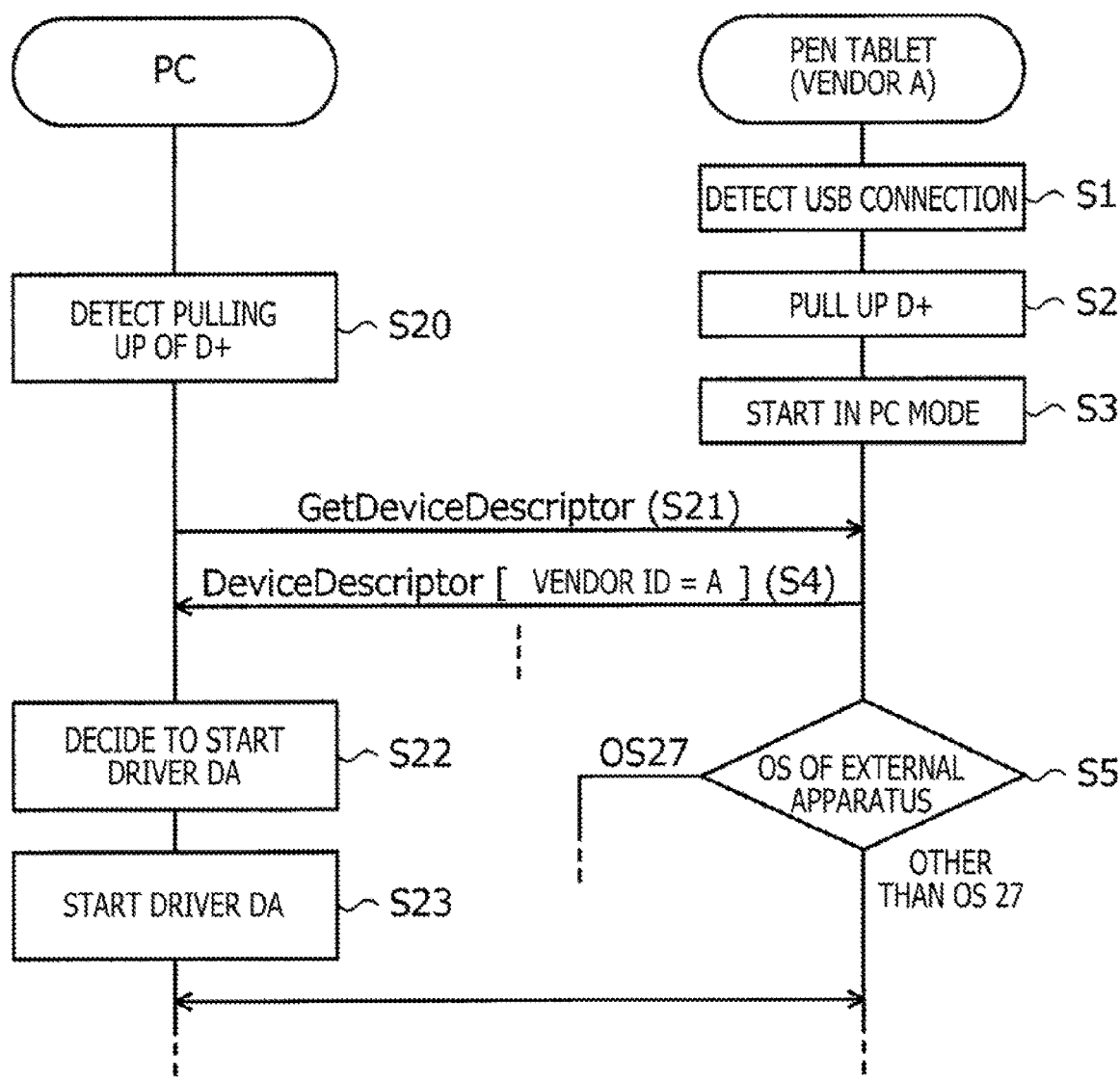
FIG. 6 is a diagram illustrating a processing sequence between the PC and the pen tablet.

FIG. 6 is a diagram illustrating a processing sequence between the PC 10 and the pen tablet 1. The processing of the PC 10 which processing will be illustrated in the following is performed by the processor 14 illustrated in FIGS. 2A and 2B, and the processing of the pen tablet 1 is performed by the controller 3 illustrated in FIGS. 2A and 2B.

As illustrated in FIG. 6, first, the pen tablet 1 detects that the USB cable C is connected to the USB communicating circuit 4 (S1), and next pulls up the signal wiring D+ (S2). The pen tablet 1 thereafter starts communication in the above-described PC mode (mode corresponding to the pen tablet driver DA) (S3).

When the PC 10 detects the pulling up of the signal wiring D+ (S20) in response to the pulling up of the signal wiring D+ at S2, the PC 10 transmits a command GetDeviceDescriptor for requesting transmission of a product ID and a vendor ID to the pen tablet 1 by using the signal wiring D+ and D− (S21). Receiving this command, the pen tablet 1 transmits a response DeviceDescriptor including the product ID indicating the pen tablet and the vendor ID indicating the vendor A (S4).

Receiving this response, the PC 10 determines that the driver to be applied is the pen tablet driver DA by referring to the driver table illustrated in FIG. 4 (S22). As described above, the PC 10 can use the pen tablet driver DA. The PC 10 therefore starts communication by actually starting the determined pen tablet driver DA (S23).

Meanwhile, the pen tablet 1 determines whether or not the OS of the external apparatus as a communication partner is the OS 27 by analyzing the transmission and reception of the command GetDeviceDescriptor and the response DeviceDescriptor and another communication pattern (S5). In the case of FIG. 6, the external apparatus as a communication partner is the PC 10, and therefore a result of this determination is negative. In this case, the pen tablet 1 continues performing communication in the PC mode. The PC 10 is also performing communication using the pen tablet driver DA. Thus, communication between the PC 10 and the pen tablet 1 is performed without any problem in this state.

Figure 7:
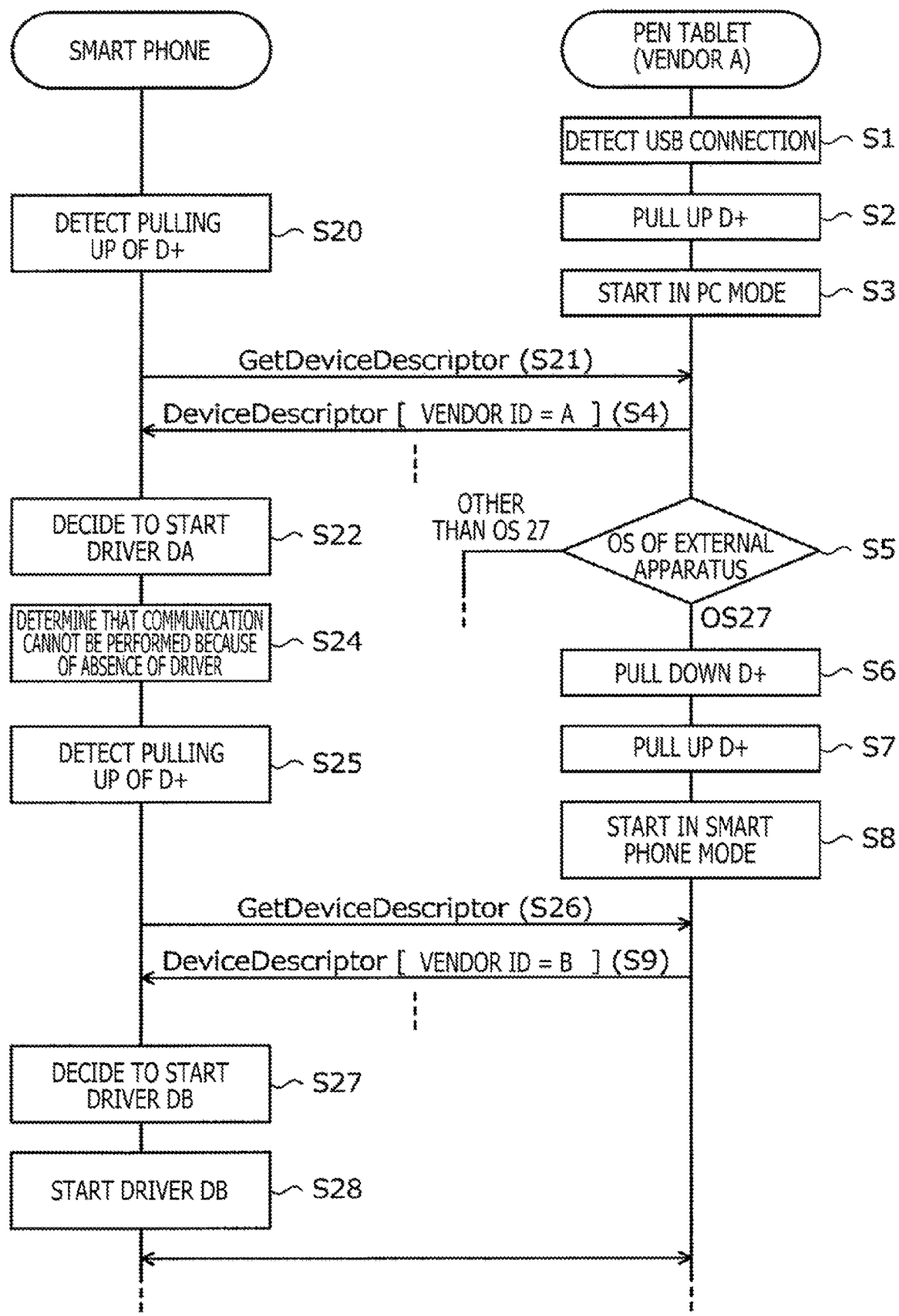
FIG. 7 is a diagram illustrating a processing sequence between the smart phone and the pen tablet.

Next, FIG. 7 is a diagram illustrating a processing sequence between the smart phone 20 and the pen tablet 1. The processing of the smart phone 20 which processing will be illustrated in the following is performed by the processor 24 illustrated in FIG. 2B, and the processing of the pen tablet 1 is performed by the controller 3 illustrated in FIG. 2B.

The processing at S1 to S5 and S20 to S22 is similar to the processing illustrated in FIG. 6. The smart phone 20, which decides to start the pen tablet driver DA at S22, determines that communication cannot be performed because the pen tablet driver DA is not present within the smart phone 20 (S24). As a result, communication between the smart phone 20 and the pen tablet 1 is temporarily ended here.

Meanwhile, a result of the determination at S5 is affirmative in the example of FIG. 7 because the external apparatus as a communication partner is the smart phone 20 operating on the OS 27. In this case, the pen tablet 1 performs processing of once disconnecting connection between the USB communicating circuit 4 and the external apparatus, and switching to communication in the above-described smart phone mode (mode corresponding to the pen tablet driver DB). Specifically, the potential of the signal wiring D+ is first pulled down to a predetermined value or lower (pull-down, S6), and the potential of the signal wiring D+ is thereafter pulled up again (S7). Thus, the smart phone 20 detects the pulling up of the signal wiring D+ again (S25), and transmits a command GetDeviceDescriptor to the pen tablet 1 again (S26).

After S7, the pen tablet 1 starts communication in the smart phone mode (S8). Then, in response to the command transmitted at S26, the pen tablet 1 transmits a response DeviceDescriptor including the product ID indicating the pen tablet and the vendor ID indicating the vendor B (S9).

According to the driver table illustrated in FIG. 4, the vendor ID indicating the vendor B is associated with the pen tablet driver DB. Hence, receiving the response DeviceDescriptor including the vendor ID indicating the vendor B, the smart phone 20 determines that the driver to be applied is the pen tablet driver DB (S27). The pen tablet driver DB can be used also in the smart phone 20. Thus, the smart phone 20 actually starts the determined pen tablet driver DB (S28), and communicates with the pen tablet 1.

According to the pen tablet 1 in accordance with the present embodiment, processing on the pen tablet 1 side can make the pen tablet 1 of the vendor A and the smart phone 20 able to communicate with each other.

As described above, according to the present embodiment, the pen tablet 1 can operate in the PC mode corresponding to the own driver of the vendor when the pen tablet 1 transfers data to the PC 10 operating on the OS 17 of Microsoft Windows (registered trademark), and operate in the smart phone mode corresponding to the versatile driver different from the own driver of the vendor when the pen tablet 1 transfers data to the smart phone 20 operating on the OS 27 of Android (registered trademark).

Hence, the pen tablet 1 can communicate with each of the PC 10 operating on the OS 17 of Microsoft Windows (registered trademark) and the smart phone 20 operating on the OS 27 of Android (registered trademark). It can therefore be said that the pen tablet 1 capable of supporting a multi-device environment and a multi-OS environment can be provided. In addition, in spite of the specifications of the smart phone 20 in which specifications the vendor's own driver cannot be installed, it is possible to avoid a situation in which the OS 27 of the smart phone 20 fails in starting the vendor's own driver, and therefore the pen tablet 1 cannot be used as a result of determining the vendor's own driver as a target to be started because the vendor's own driver is stored in the driver table.

A preferred embodiment of the present disclosure has been described above. However, the present disclosure is not at all limited to such an embodiment, but the present disclosure can of course be carried out in various modes without departing from the spirit of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A pen tablet comprising:
   a communication interface configured to communicate with both a first external apparatus that operates using a first operating system and a second external apparatus that operates using a second operating system; and
   a controller configured to operate in a first mode corresponding to a first driver and operate in a second mode corresponding to a second driver,
   wherein the first driver is different from the second driver, and
   wherein the controller is configured to:
      perform first communications via the communication interface with the second external apparatus in the first mode, wherein during the first communications the pen tablet transmits to the second external apparatus product identification information and first vendor identification information corresponding to the first driver, wherein during the first communications, the second external apparatus decides to start the first driver on the second external apparatus, and wherein the first communications end as a result of the second external apparatus determining that the first communications cannot be performed because the first driver is not present within the second external apparatus, and
      after the first communications end, perform second communications via the communication interface with the second external apparatus in the second mode, wherein during the second communications the pen tablet transmits to the second external apparatus the product identification information and second vendor identification information corresponding to the second driver.

2. The pen tablet according to claim 1, wherein:
   the controller connects to the first external apparatus as a first device while the controller operates in the first mode, and
   the controller connects to the second external apparatus as a second device different from the first device while the controller operates in the second mode.

3. The pen tablet according to claim 2, wherein:
   the controller transmits the first vendor identification information to the first external apparatus while the controller operates in the first mode.

4. The pen tablet according to claim 1, wherein the controller is configured to:
   start the first communications in response to a connection of the communication interface to the second external apparatus; and
   switch to the second communications while operating in the second mode when the controller determines that the operating system of the second external apparatus is the second operating system.

5. The pen tablet according to claim 4, wherein the controller switches to the second communication while operating in the second mode by disconnecting the connection between the communication interface and the second external apparatus.

6. A method performed by a pen tablet, the method comprising:
   communicating via a communication interface with a first external apparatus that operates using a first operating system;
   communicating via the communication interface with a second external apparatus that operates using a second operating system;
   operating a controller in a first mode corresponding to a first driver;
   operating the controller in a second mode corresponding to a second driver,
   wherein the first driver is different from the second driver;
   performing first communications via the communication interface with the second external apparatus in the first mode, wherein the first communications include transmitting to the second external apparatus product identification information and first vendor identification information corresponding to the first driver, wherein during the first communications, the second external apparatus decides to start the first driver on the second external apparatus, and wherein the first communications end as a result of the second external apparatus determining that the first communications cannot be performed because the first driver is not present within the second external apparatus, and
   after the first communications end, performing second communications via the communication interface with the second external apparatus in the second mode, operating the controller wherein the second communications including transmitting to the second external apparatus the product identification information and second vendor identification information corresponding to the second driver.

7. The method according to claim 6, further comprising:
   connecting to the first external apparatus as a first device while operating the controller in the first mode; and
   connecting to the second external apparatus as a second device different from the first device while operating the controller in the second mode.

8. The method according to claim 6, the method comprising:
   transmitting the first vendor identification information to the first external apparatus while operating the controller in the first mode.

9. The method according to claim 6, further comprising:
   disconnecting a connection to the second external apparatus.

10. A non-transitory computer-readable medium storing computer-readable instructions that, when executed by a processor, cause a pen tablet to:
   communicate via a communication interface with a first external apparatus that operates using a first operating system;
   communicate via the communication interface with a second external apparatus that operates using a second operating system;
   operate in a first mode corresponding to a first driver;
   operate in a second mode corresponding to a second driver,
   wherein the first driver is different from the second driver;
   perform first communications via the communication interface with the second external apparatus in the first mode, wherein during the first communications the pen tablet transmits to the second external apparatus product identification information and first vendor identification information corresponding to the first driver, wherein during the first communications, the second external apparatus decides to start the first driver on the second external apparatus, and wherein the first communications end as a result of the second external apparatus determining that the first communications cannot be performed because the first driver is not present within the second external apparatus; and after the first communications end, when performing second communications via the communication interface with the second external apparatus in the second mode, operate wherein during the second communications the pen tablet transmits to the second external apparatus the product identification information and second vendor identification information corresponding to the second driver.

11. The computer-readable medium according to claim 10, wherein:
the instructions, when executed by the processor, cause the pen tablet to:
connect to the first external apparatus as a first device while operating in the first mode; and
connect to the second external apparatus as a second device different from the first device while operating in the second mode.

12. The computer-readable medium according to claim 10, wherein the instructions, when executed by the processor, cause the pen tablet to:
transmit the first vendor identification information to the first external apparatus while operating in the first mode.

13. The computer-readable medium according to claim 10, wherein the instructions, when executed by the processor, cause the pen tablet to disconnect a connection to the second external apparatus when switching from operating in the first mode to operating in the second mode.

14. The pen tablet according to claim 1, wherein:
the controller is configured to determine, based on a result of the first communications, that an operating system of the second external apparatus is the second operating system, and
the second communication are performed after the first communications end and after the operating system of the second external apparatus is determined to be the second operating system.

15. The method according to claim 6, further comprising:
determining, based on a result of the first communications, that an operating system of the second external apparatus is the second operating system, and
the second communication are performed after the first communications end and after the operating system of the second external apparatus is determined to be the second operating system.

16. The computer-readable medium according to claim 10, wherein:
the computer-readable instructions, when executed by a processor, cause the pen tablet to determine, based on a result of the first communications, that an operating system of the second external apparatus is the second operating system, and
the second communication are performed after the first communications end and after the operating system of the second external apparatus is determined to be the second operating system.

* * * * *